Oct. 2, 1923.

B. F. CRISENBERRY

SYRINGE

Filed Oct. 20, 1920

1,469,764

Inventor
Benjamin F. Crisenberry,
By
Hood Ashley
Attorneys

Patented Oct. 2, 1923.

1,469,764

UNITED STATES PATENT OFFICE.

BENJAMIN F. CRISENBERRY, OF INDIANAPOLIS, INDIANA, ASSIGNOR OF TWO-THIRDS TO MORRIS L. WHITE, OF INDIANAPOLIS, INDIANA.

SYRINGE.

Application filed October 20, 1920. Serial No. 418,190.

*To all whom it may concern:*

Be it known that I, BENJAMIN F. CRISENBERRY, a citizen of the United States, residing at Indianapolis, in the county of Marion and State of Indiana, have invented a new and useful Syringe, of which the following is a specification.

It is the object of my invention to provide a syringe, especially for vaginal use, which may be used both to inject and withdraw the fluid used, through separate passages, whereby thorough cleansing may be obtained without spilling any of the liquid, and which will not injure the membranes with which it comes in contact; and to improve and simplify the construction and operation of syringes of this type.

My present invention is an improvement on the syringe shown in my prior Patent No. 873,728, granted Dec. 17, 1907.

Figure 1:
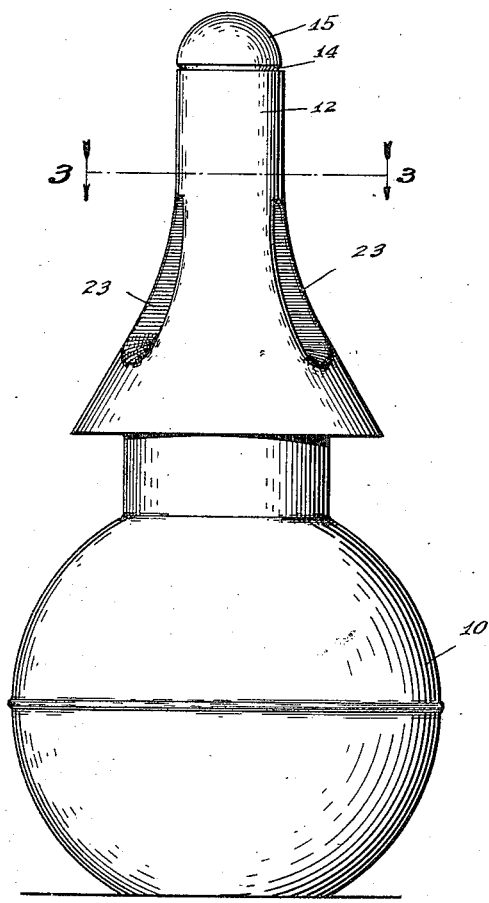
Figure 2:
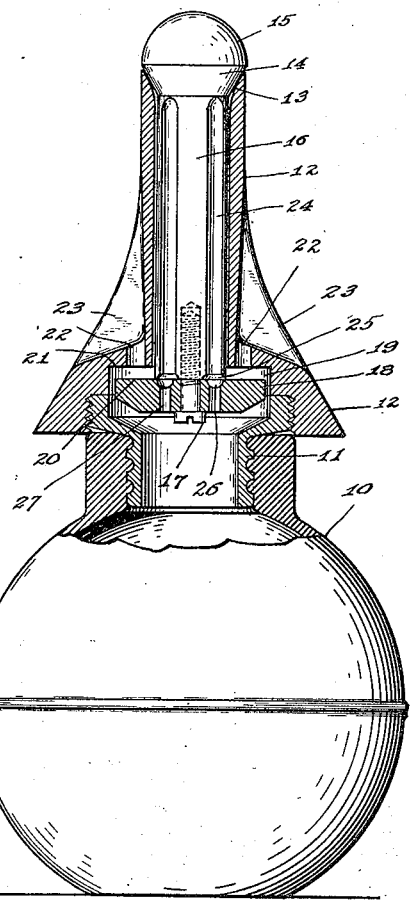
Figure 3:
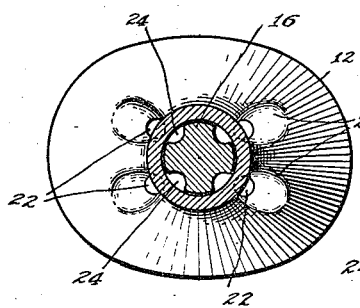
Figure 4:
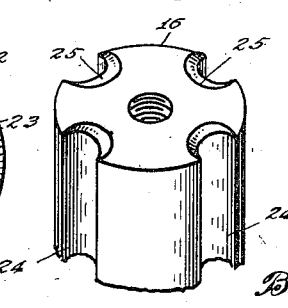
Figure 5:
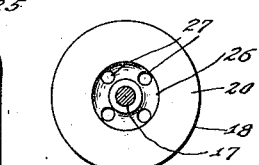

The accompanying drawing illustrates my invention: Fig. 1 is an elevation of a syringe embodying my invention; Fig. 2 is a central longitudinal section through such syringe, with the bulb in elevation; Fig. 3 is a section on the line 3—3 of Fig. 1; Fig. 4 is a perspective view of the lower end of the valve stem, in inverted position and on an enlarged scale; and Fig. 5 is a plan of the disk valve, with its attaching screw in section.

A collapsibly resilient hollow bulb 10, spherical and of rubber, has a screw fitting 11 in its single opening, and on this screw fitting 11 is detachably screwed the nozzle 12. This nozzle is in the form of a tube, cylindrical internally, and curvingly flaring externally toward the base end by which it is mounted on the screw fitting 11, and in general is oval in cross-section at its large end but circular in cross section at its smaller end, the two ends being connected by smooth curves. This shape is found to be most advantageous in use. The tubular nozzle 12 is open at its outer or smaller end, which is provided with an internal curvingly tapered valve seat 13 with which cooperates a tapered valve 14 provided on a ball head 15, the tapers of the valve seat 13 and valve 14 being so arranged that such two parts engage one another only at a distance from the edge and are separated from each other at the edge so that there will be no possibility of pinching between them. The head 15 is fixed to the outer end of a valve stem 16, which has a close sliding fit within the tube 12 of the nozzle, and on the inner end of such stem 16 is fixed, by a screw 17, a disk 18 located within a chamber 19 in the base of the nozzle 12. The respective surfaces 20 and 21 of the disk 18 and chamber 19 remote from the bulb 10 are plane surfaces, which cooperate to form a valve, which controls openings 22 which lead through the surface 21 into grooves 23 formed in the outer surface of the flaring part of the nozzle. These grooves 23 are some distance away from the open end of the nozzle. The surfaces 14 and 20 are farther apart than are the surfaces 13 and 21, so that when the surfaces 13 and 14 are in contact the surfaces 20 and 21 are out of contact, and vice versa. The valve structure including the parts 15, 16, and 18 moves as a unit upon variations in pressure produced by manipulation of the bulb 10, moving upward when the bulb is pressed and downward when the bulb is released. The valve stem 16 is provided with a plurality of longitudinally extending slots 24 in its surface, which slots extend from the lower end of such valve stem almost or completely to the valve surface 14. The lower ends 25 of these grooves 24 are countersunk, as shown in Figs. 2 and 4, and communicate with an annular groove 26 formed in the upper surface of the disk 18; and such disk is provided with a plurality of holes 27 extending through the disk opening into such annular groove 26. This provides a connection from the space below the disk 18 through the holes 27, the annular groove 26, and the longitudinal grooves 24 to the outer or upper end of the nozzle when the valve is raised, regardless of whether or not the holes 27 and grooves 24 register, so that the disk 18 may be attached to the valve stem 16 in any angular position; and in addition the valve stem has a guiding fit within the tubular nozzle 12 without interfering with the liquid flow therethrough, by which guiding fit all lateral movement of the valve stem 16 and head 15 is prevented, so that at the same time proper fit of both valves is assured and the possibility of pinching between the valve 14 and the edge of the valve seat 13 is eliminated.

In operation, the bulb 10 is filled with the desired liquid in the usual manner, and when the device is in position the bulb 10 is squeezed. This raises the valve structure 15—16—18, thus closing the openings 22 and opening the valve 13—14, and continued squeezing of the bulb forces liquid from the bulb through the passages 27—26—24 and out through the open end of the nozzle between the surfaces 13 and 14. The liquid discharge is in the form of a flaring conical sheet. When the discharge has been completed and it is desired to withdraw the liquid the bulb 10 is allowed to expand, producing a suction which shifts the valve structure 15—16—18 to close the valve 13—14 and open the openings 22, and then withdraws the liquid into the bulb 10 through the passages 23—22 and chamber 19. This is done without possibility of injury, as the places where the valve surfaces engage one another are all internal and the suction passages leading to the valve surfaces 20—21 are of such length and the edges of the grooves 23 are so smoothly shaped that injury cannot occur.

I claim as my invention:

1. In a syringe, the combination of a bulb, a nozzle mounted thereon, said nozzle having a discharge opening at the end and inlet openings at the sides, a valve stem having a sliding fit within said nozzle and being provided with longitudinal passages, and two valves fixed on opposite ends of said stem and operating to close said discharge opening and said inlet openings respectively when said valve stem is moved in opposite directions.

2. In a syringe, the combination of a bulb, a nozzle mounted thereon, said nozzle having a discharge opening at the end and inlet openings at the sides, a valve stem having a sliding fit within said nozzle and being provided with longitudinal passages, and two valves fixed on opposite ends of said stem and operating to close said discharge opening and said inlet openings respectively when said valve stem is moved in opposite directions, the valve which controls said inlet openings being provided with an annular groove into which said longitudinal passages of said stem open and also being provided with holes through it communicating with said annular groove.

In witness whereof, I have hereunto set my hand at Indianapolis, Indiana, this 16th day of October, A. D. one thousand nine hundred and twenty.

BENJAMIN F. CRISENBERRY.